United States Patent [19]

Wiech, Jr.

[11] 4,445,936

[45] May 1, 1984

[54] METHOD OF MAKING INELASTICALLY COMPRESSIBLE DUCTILE PARTICULATE MATERIAL ARTICLE AND SUBSEQUENT WORKING THEREOF

[75] Inventor: Raymond E. Wiech, Jr., San Diego, Calif.

[73] Assignee: Witec Cayman Patents, Ltd., Cayman Islands

[21] Appl. No.: 332,637

[22] Filed: Dec. 21, 1981

Related U.S. Application Data

[63] Continuation of Ser. No. 111,634, Jan. 14, 1980, abandoned.

[51] Int. Cl.$^3$ .............................................. B22F 3/00
[52] U.S. Cl. ...................................... 75/228; 419/28; 419/36
[58] Field of Search ................. 419/28, 2, 36; 75/228; 428/546

[56] References Cited

U.S. PATENT DOCUMENTS

| | | | |
|---|---|---|---|
| 3,809,553 | 5/1974 | Peaslee | 75/200 |
| 3,810,757 | 5/1974 | Andrews et al. | 75/200 |
| 3,832,763 | 9/1974 | Schober | 29/420.5 |
| 3,989,518 | 11/1976 | Rueckl | 75/211 |
| 4,006,016 | 2/1977 | Zambrow et al. | 75/200 |

OTHER PUBLICATIONS

Henderson, *Metallurgical Dictionary*, (1953), pp. 76, 111, 112, 141, 292.

*Primary Examiner*—Brooks H. Hunt
*Attorney, Agent, or Firm*—Jay M. Cantor

[57] ABSTRACT

Ductility is controlled by controlling the size of the particles of particulate material and/or the degree of sphericity of the particles, the smaller and/or more spherical the particles, the greater the ductility of the material. The material has preferably spherical pores, preferably hermetic, with a controlled ratio of pore volume to material volume to provide the property of compressibility. The particulate material itself must have the capability of becoming ductile. The ratio of pore volume to total volume of the material is controlled by particle size, sintering profile the property of the material and the initial volume loading of the presintered part (i.e. the ratio of binder to particulate material). Some materials which are not ductile in and of themselves can be formed into ductile and/or compressible materials in accordance with the system of the present invention.

8 Claims, No Drawings

METHOD OF MAKING INELASTICALLY COMPRESSIBLE DUCTILE PARTICULATE MATERIAL ARTICLE AND SUBSEQUENT WORKING THEREOF

This is a continuation of Ser. No. 111,634 filed Jan. 14, 1980 now abandoned.

BACKGROUND OF THE INVENTION

Precision parts in accordance with the prior art have generally been formed by machining parts from a forged metal or by making a casing of the metal and subsequent possible machining or by compacting powdered particulate materials and subsequently processing according to the well known powdered metallurgy arts. The subsequent parts formed by forging and casting are essentially incompressible due to the nature of the starting materials which were incompressible. The prior art powdered metals are also essentially incompressible because, in a first type of system, the porous particulate material form is infused with a material, such as molten copper, thereby making the form more ductile but eliminating the pores and therefor making the part incompressible. In a second form, wherein merely the sintered form is provided, the material has been brittle and not ductile and, for this reason, any compression thereof would cause cracking as with the breaking of cast iron. For this reason, the prior art materials which were incompressible could not be further compressed and those parts which were compressible also could not be compressed and retain their shape due to their lack of ductility. For this reason, forming techniques in the form of closed die crush forming have not been possible since certain materials could not be crushed or compressed and those that could had no or little ductility and therefore could not retain their shape when crushed. For this reason, crush forming of metal has not been used for high precision parts and particularly high precision stressed parts.

BRIEF DESCRIPTION OF THE INVENTION

Ductility is controlled by controlling the size of the particles of particulate material and/or the degree of sphericity of the particles, the smaller and/or more spherical the particles, the greater the ductility of the material. The material has preferably spherical pores, preferably hermetic with a controlled ratio of pores volume to material volume to provide the property of compressibility. The particulate material itself must have the capability of becoming ductile. The ratio of pore volume to total volume of the material is controlled by particle size, sintering profile, the property of the material and the initial volume loading of the pre-sintered part (i.e. the ratio of binder to particulate material). Some materials which are not ductile in and of themselves can be formed into ductile and/or compressible materials in accordance with the system of the present invention. This material can then be formed into a predetermined shape with subsequent binder removal and sintering in accordance with prior art methods except that the sintering profile may be controlled, if necessary, as one means of controlling the desired porosity of the part.

Materials as described above can be formed by inelastic compression techniques since the articles are compressible due to the voids, the compressed material retaining its compressed shape. This can be provided by the well known coining, hot isostatic pressing techniques and other well known techniques. Precision parts with densities approaching theoretical maximum density for the material involved can be preformed using these techniques. In accordance with this method, a part is formed and sintered having a shape which is substantially the same as the final shaped desired but of slightly larger dimension. This article is then placed in a forming die cavity and compressed according to the contour of the die. Unlike conventional materials, the form will compress to the shape of the die with great accuracy. It is necessary, of course, that the degree of compression in the forming machine in volumetric terms be the same as or less than the volumetric content of the pores within the body to be formed. In this way, precision parts can be formed to predetermined substantially exact dimension with substantially no flash.

In accordance with the present invention, there is provided a material which is plastically compressible, permanently deformable and which is capable of being crush formed into precision parts which exactly duplicate the mold cavity in which they are crushed with precision and which are highly ductile. The degree of compressability and ductility is controllable and predetermined. The material is formed by providing particulate material and binder and mixing same in accordance with prior art techniques, the degree of ductility and the volume ratio of pores to final material after sintering of a formed part being determined by the sintering time/temperature profile, the size of the particulate material particles, the degree of sphericity of the particles, the chemical nature of the particles and the sintering atmosphere. The diffusion of material from particle to particle should be of the same order as particle size itself. Also, the particle size range is preferably kept to a minimum. This can be readily determined on a material by material basis with simple experimentation to obtain the desired porosity and ductility of the final preformed article after sintering. The sintered article which is provided will be ductile to a degree as predetermined and will be compressible in an amount as predetermined so that such material can be crush formed by conventional techniques such as coining, rolling, isostatic pressing and other types of forming as will be apparent to those skilled in the art.

In order to form precision parts using the above described material, a preform is made as above described which is substantially similar in shape to the final article except that the volume of the preform is larger than the final article by a volumetric amount which is less than the volume of the pores within the preform. The preform can then be placed into a crush forming apparatus, such as a coining device, and crush formed within the die of the coining device. The preform will be compressed to exactly conform to the shape of the die with high precision with proper allowance for springback. Since the compressed volume of the preform exactly matches the volume within the die, there will be no flash and the final density of the precision article will closely approach the maximum density of the material from which the article is formed.

DETAILED DESCRIPTION OF PREFERRED EMBODIMENTS

The inelastic compressible material (i.e. material which when compressively deformed will maintain a negative volumetric permanent set) is formed by initially mixing a particulate material with a binder. The particulate material can be any material which can be reduced to a particle and which has a potential property of ductility, (i.e. the particulate material can be altered later from a brittle material to a ductile or malleable material). The coefficient of diffusivity between the particles of particulate material must be sufficiently great so as to permit sintering at a reasonable rate. The term reasonable is based upon the economics involved in the particulate item being manufactured. Materials which meet the above requirements are iron, steel, substantially all other ductile metals, and ductile alloys.

The size of the particles of particulate material will vary in accordance with certain conditions. Preferred sizes normally run in the range of 1 to 5 microns though some specific materials may go down to tenths of microns and others may be in excess of ten microns. Tungsten would normally be in the tenths of microns range. The lower end of the size scale is dependent upon the flowability of the binder and particulate material mixture and it is often desirable to have the particles as small as possible as long as flow is available. The minimum size of particle that will flow is a function of the interfacial energy between the binder and the surface of the particulate material particles.

The shape of the particulate material particles is theoretically preferably spherical. In fact, it is desirable to have particles of a shape that minimize the total surface area of the particles per unit volume of the particles. For this reason, the ideal shape tends to be spherical although ovoid shapes and other similar shapes are successful. Dendritic and extended area shapes are not desirable though, in certain cases, some may operate satisfactorily.

With reference to the binder, it must have plastic properties such as polyethylene, nylon, polypropylene, many waxes such as carnauba and beeswax, paraffin and any other bindive material which is chemically inert with respect to the particulate material and which can easily be removed after the parts have been formed to their desired shape but prior to sintering.

The amount of binder relative to the amount of particulate material used in a mixture would be that amount of binder which will totally fill the interstices between the particles of particulate material. It is preferred that the highest concentration of particulate material relative to binder be used consistent with obtaining the necessary flow conditions for molding. A second consideration is to use less than the maximum amount of particulate material in the binder in the event it is desirable to adjust the pore volume in the final sintered article.

The binder and particulate materials are then mixed until they become homogeneous and the mixture, which is now homogeneous, is then used to form shaped articles by conventional means such as injection molding, extrusion, casting and the like as is well known to those skilled in the art. After the forming of the article by molding, the binder is removed by conventional technology as noted in Strivens U.S. Pat. No. 2,939,199 and British Pat. No. 779,242 and Wiech British Pat. No. 1,516,079 or by other appropriate techniques as may exist now or in the future. The article with binder removed is then sintered in accordance with conventional techniques, though, as will be explained hereinbelow, by controlling and adjusting the time and temperature profile of sintering, the pore size in the article can be controlled, thereby controlling the volumetric ratio of voids to final article volume.

The final sintered article will have the properties of being highly ductile, compressible and have the voids or pores therein uniformly distributed throughout the material.

The material as described above, after sintering, can now be crush formed to desired shapes and provide such shapes with extreme precision and relatively inexpensively relative to prior art methods. In the case of coining, the sintered articles would be formed in the molded state to substantially the same shape as the final article to be coined. However, the sintered part would have a slightly large volume than the ultimate part, the difference between the volume of the sintered part and the final part being approximately equal to or less than the volume of the voids or pores in the sintered part. The consideration here is that, upon compression during coining, the material must have somewhere to flow without overflowing from the mold cavity. For this reason, if the volume of the pores in the article is the same as or greater than the difference in volume between the sintered article and the final article, all of the material during coining will remain within the mold cavity and eliminate the possibility of flash. Furthermore, since the density of the finally formed article will be substantially equal to or very closely approach the density of the raw metal without pores, the coined or crushed material within the mold will substantially exactly duplicate the shape of the mold with extreme precision down to thousandths of an inch and possibly with even more precision. This is accomplished by placing the sintered article into the coining system and particularly into the mold cavity therein. The coining operation then takes place in its normal manner and compresses the sintered article to conform to the shape of the mold as stated hereinabove. The coined article is then removed from the mold and is found to have no flash and to substantially exactly duplicate the shape of the mold. This procedure can be utilized in other types of crush forming systems such as drop forging, cold rolling, isostatic pressing and other similar forming systems.

EXAMPLE I

Three hundred fifteen grams of substantially spherical nickel particulate material having an average particle size of four to seven microns and a specific surface area of 0.34 square meters per gram (Inco type 123 nickel powder) was mixed with 35.2 grams of carnauba wax. The mixture was placed in a laboratory type sigma blade mixer of one quart capacity and mixed at a temperature of 100° C. for a period of one-half hour. A homogeneous, uniform and modest viscosity plastisole formed. It was removed from the mixer, allowed to cool for an hour until the carnauba wax had solidified. The hardened material was broken up by a hammer and the pieces were placed into an injection molding machine of one-half ounce capacity. Several dozen rings were formed in the injection molding machine. Three at random were removed from this batch and placed in a Blue M. laboratory oven on laboratory filter paper and the temperature was slowly raised from ambient temperature to the melting point of the binder of carnauba wax over a period of twenty minutes. The oven was permitted to sit at this temperature overnight for about 12 hours after which a ring of carnauba wax on the filter paper was noticed. The temperature over the next 8 hours was raised to 100° C. and the oven was maintained at this temperature overnight. The following day the molded wax ring on the filter paper had increased greatly. The temperature in the oven was then raised to 150° C. for 48 hours whereupon the temperature was again raised to 200 ° C. for 8 hours. The oven was then allowed to cool and, when the temperature was close to room temperature, the three rings were removed therefrom. The rings were then placed into a controlled atmosphere kiln, the atmosphere of which was maintained at 90% argon and 10% hydrogen at a dew point of less than minus 60° C. The temperature was raised in the course of the next 24 hours from ambient to 700° C. in a substantially linear manner. The temperature was then raised to 1300° F. and maintained and then raised to a temperature of 2150° F. over a course of 6 hours in a linear manner. This temperature was maintained for one hour and the kiln was shut off and allowed to cool to substantially room temperature. The three rings were removed from the kiln and weighed and placed in a pycnometer and the density of each of the rings was determined to be 8.54 grams/cc. A metallographic section of one specimen was then made, embedded in bakolite, polished and etched as to ASTM specification and then placed under a microscope. Spherical inclusions were noted substantially homogeneously distributed throughout the sample. The inclusions were much smaller than the crystal size and had a tendency to be located along crystal boundaries. The general appearance was that of forged material with spherical inclusions. The second ring that was removed from the kiln was measured and found to have an outside diameter of 0.890 to 0.886 inches since a perfect circle was not obtained. The second ring was then placed in a circular die of diameter 0.885 inches and forced through the die by an arbor press. The ring was measured and found to have a substantially uniform diameter of 0.886 inches. That portion of the ring that was forced through the die was bright and shiney in appearance. As measured by a pycnometer, the density was found to be 8.65 after having made a weight check. The weight of the part was found to remain substantially constant. A metallographic section was made of the second ring in the manner described above. It was found that the uniform spherical inclusion structure had been altered by the compression of the outer circumference of the ring so that the outermost inclusions had compressed into an oblate shape with major axis about the same as the diameter of the spheres and the minor axis lying along the plane of the radius of the ring. The spherical inclusions along the inner diameter of the ring were found to be relatively unchanged.

EXAMPLE II

A run was made exactly the same as in Example I with exactly the same equipment with the particulate material being changed from nickel to substantially spherical iron of average particle diameter of 4 to 6 microns of substantially spherical shape. In this example 278.19 grams of iron were mixed with carnauba wax. The same testing procedure as set forth in Example I was utilized and the results were substantially identical to those listed in Example I except that the density of the rings removed from the kilns was approximately 7.46. The same results as in Example I were obtained after compression in a die in an arbor press.

EXAMPLE III

A further run was made using exactly the same procedure as set forth in Example I except that a mixture of nickel and iron was substituted for nickel alone. 50% of the weight of nickel as set forth in Example I and 50% of the weight of iron as set forth in Example II were utilized and mixed with 35.2 grams of carnauba wax. The results were exactly as set forth above with reference to Example I. The density of the rings after removal from the kiln was not measured specifically but the volume was found to have decreased after removal from the die. The weight of the body after sintering and after removal from the die was substantially the same. The article as observed during the metallographic observation under the microscope was noted to be a true alloy rather than isolated regions of nickel and iron.

EXAMPLE IV 185.3 grams of $Fe_2O_3$ of particle size less than 1 micron (of the type used for making magnetic tape as is well known) was mixed with 35.2 grams of carnauba wax and then operated on as set forth in Example I. The ring was molded as in Example I, except that firing schedule in the atmospheric kiln was not the same. The temperature was immediately raised to 700° F. and thereafter there was no difference in the firing schedule as set forth in Example I. The iron oxide is found to be reduced to metallic iron by the hydrogen component of the sintering atmosphere. There is also found a substantial decrease in volume of the ring during sintering. When the sintered pieces that were left were measured with a pycnometer, before and after hitting with a hammer, it was determined qualitatively that crushing took place. It was found quantitatively in the pycnometer that density increased. The important feature in this example is that $Fe_2O_3$ is a brittle material and so the starting material is brittle and does not have ductility at any time whereas the sintered material evolved did have ductility.

Though the invention has been described with respect to specific preferred embodiments thereof, many variations and modifications will immediately become apparent to those skilled in the art. It is therefore the intention that the appended claims be interrupted as broadly as possible in view of the prior art.

What is claimed is:

1. A method of producing an article in the form of a fired powdered metal which is then crush formed and compressed to desired shape, comprising the steps of:
    (1) mixing together predetermined amounts of particulate material and binder whereby said binder covers substantially all of the surfaces of the particles of said powdered metal, said particles of particulate material having a high degree of sphericity, the size range of said particles being kept to a minimum,
    (2) forming said mixture from (1) into a desired configuration,
    (3) removing the binder from said configuration in (2),
    (4) sintering the stripped and formed material from (3) according to a time-temperature profile to provide predetermined pore volume to material volume ratio of hermetic pores,
    (5) cooling said material, and
    (6) crush forming by isostatically pressing said material to compress the material from (4), the volume of compression approaching but not exceeding the volume of said pores.

2. The method of claim 1 wherein said particulate material is selected from the class consisting of ductile metals, ductile alloys and non-ductile materials which become ductile after sintering.

3. A method as set forth in claim 1 wherein said step of crush forming is performed by hot isostatic pressing.

4. A method as set forth in claim 2 wherein said step of crush forming is performed by hot isostatic pressing.

5. The product of the process of claim 1.
6. The product of the process of claim 2.
7. The product of the process of claim 3.
8. The product of the process of claim 4.

* * * * *